United States Patent [19]

Baird

[11] Patent Number: 5,001,766

[45] Date of Patent: Mar. 19, 1991

[54] APPARATUS AND METHOD FOR SKEW CONTROL OF DOCUMENT IMAGES

[75] Inventor: Henry S. Baird, Maplewood, N.J.

[73] Assignee: AT&T Bell Laboratories, Murray Hill, N.J.

[21] Appl. No.: 194,686

[22] Filed: May 16, 1988

[51] Int. Cl.$^5$ ............................ G06K 9/32; G06K 9/46
[52] U.S. Cl. ............................................ 382/46; 382/18
[58] Field of Search ............................... 382/46, 18, 48

[56] References Cited

U.S. PATENT DOCUMENTS

| | | | |
|---|---|---|---|
| 4,338,588 | 7/1982 | Chevillat et al. | 382/46 |
| 4,497,066 | 1/1985 | Gasparri, Jr. | 382/18 |
| 4,539,703 | 9/1985 | Clearman et al. | 382/28 |
| 4,558,461 | 12/1985 | Schlang | 382/46 |
| 4,688,088 | 8/1987 | Hamazaki et al. | 382/18 |

*Primary Examiner*—Leo H. Boudreau
*Assistant Examiner*—Steven P. Fallon
*Attorney, Agent, or Firm*—G. E. Nelson

[57] ABSTRACT

A method and apparatus for determining a predominant angle of orientation of an image with respect to a reference angle. A file of picture elements is generated which depicts the image with respect to the reference angle. The picture elements are projected onto a plurality of contiguous segments of imaginary lines at selected angles across the file. Each imaginary line is perpendicular to its associated direction of projection. The number of picture elements that fall into the segments for each projection are counted. An enhancement function is applied to the segment counts of each projection. The projection that generates the largest value of the enhancement function defines the angle of orientation of the image. The position of a document scanner or the document itself may be rotated to compensate for the detected skew.

15 Claims, 5 Drawing Sheets

APPARATUS AND METHOD FOR SKEW CONTROL OF DOCUMENT IMAGES

TECHNICAL FIELD

The invention relates to the field of document reproduction, optical character readers, optical scanners, document readers and the like. In particular, the invention relates to the detection of and correction for rotational error (skew) between the dominant orientation of lines of printed objects, such as characters, of a document and a reference line observed by a reader, or the like, as being zero rotational error.

BACKGROUND OF THE INVENTION

A fundamental and pervasive problem arises in the art of automatic document analysis, character/object recognition and related fields. The problem is the recognition and correction for skew in printed documents during the automated process. By skew, it is meant the angle between the dominant orientation of lines of characters or other textual objects of a document and a reference line observed by a reader, or the like, as representing zero angular error. Exemplary of the actions that are performed during document analysis is the segmentation of images of printed documents into blocks and lines of objects, such as characters. Known segmentation methods include those called top-down methods and bottom-up methods. Top-down methods characteristically operate by estimating some global properties of an image and by using the properties to guide segmentation into local regions whose local properties are estimated in turn. Bottom-up methods of segmentation characteristically operate by first clustering characters into lines, then lines into paragraphs, and so on. Unfortunately, the top-down methods tend to be excessively sensitive to non-zero skew.

A representative bottom-up method is described by Nagy, G. et. al. in an article entitled "Document Analysis with an Expert System," *Proceedings, Pattern Recognition in Practice*, Amsterdam, 1985. This bottom-up method relies on good skew alignment, with skew angle restricted to no more than a few degrees. However, while bottom-up methods are less sensitive to skew than top-down methods, the bottom-up methods are generally slower and suffer from other problems unrelated to skew sensitivity as well.

Hashizume, Yeh, & Rosenfeld, in an article entitled "A Method of Detecting the Orientation of Aligned Components", *Pattern Recognition Letters*, 1986, pp. 125-132, describe a skew determining method based on the premise that objects, e.g. characters, are often closer to one another along a dominant line orientation than in other directions. This technique computes the nearest neighbor of each object and connects each neighboring pair with a straight line segment. A histogram of the orientations of these line segments is computed. The histogram may have a strongly-marked peak at the dominant skew angle. The skew angle is computed as an average of values near the peak. Among the known examples reported using this technique, the average error was 1.5 degrees and the worst 4.1 degrees.

W. Postl describe experiments with two methods of skew determining in a paper "Detection of Linear Oblique Structures and Skew Scan in Digitized Documents", *Proceedings, Eighth International Conference on Pattern Recognition*, Paris, October 1986, pp. 687-689. The first method applies the discrete two-dimensional Fourier transform to an image plane and examines a half plane of the power spectrum coefficients. The technique assumes an orientation angle and measures the energy in spatial frequencies at that orientation angle. The accuracy obtained with this method is not known. The second method similarly hunts for the maximum of a measure over a range of angles. The integral density of points is computed along assumed scan angles. For each pair of neighboring scan lines, the difference of their densities is computed. Finally, the sum of squares of these differences is computed.

Rastogi & Srihari describe a method using a Hough transform in an article, "Recognizing Textual Blocks Using the Hough Transform", *Department Computer Science*, University of Buffalo (SUNY), 1986. For each angle in a discrete representation of Hough space, the number of large "low-high-low transitions" is counted, and the maximum count is interpreted as identifying the dominant skew. In the five examples shown in the paper, skew angle was coarsely quantized in increments of 15 degrees.

While the above methods operate satisfactorily in some contexts, they are both slow and complex, and give coarse estimates of skew.

SUMMARY OF THE INVENTION

The invention is a method and apparatus for determining a predominant angle of orientation of an image with respect to a reference angle. A file of picture elements is generated which depicts the image with respect to the reference angle. The picture elements are projected onto a plurality of contiguous segments of imaginary lines at selected angles across the file. Each imaginary line is perpendicular to its associated direction of projection. The number of picture elements that fall into the segments for each projection are counted. An enhancement function is applied to the segment counts of each projection. The projection that generates the largest value of the enhancement function defines the angle of orientation of the image.

In a preferred embodiment, projections are first taken at a plurality of relatively coarse angles on both sides of the reference angle. This results in a first coarse estimate of the correct orientation. Then, projections are taken at more refined angles on both sides of the coarse first estimate. Also, the image file is compressed before further processing is performed, although this is not essential. The compressing involves performing a connected components analysis on the raw image file to locate individual image objects and by representing each object with one or more (preferably one) picture element. Processing operations are then performed on the compressed file.

The method works well for many page layout styles, including multiple columns, sparse tables, variable line spacings, mixed fonts, and a wide range of font styles and text sizes. Runtime of the method by a computer is proportional to the function n log (l/r), where n is the number of characters in the document and r is the angular resolution desired. A resolution of two minutes of arc is routinely achievable.

DETAILED DESCRIPTION

Figure 1:
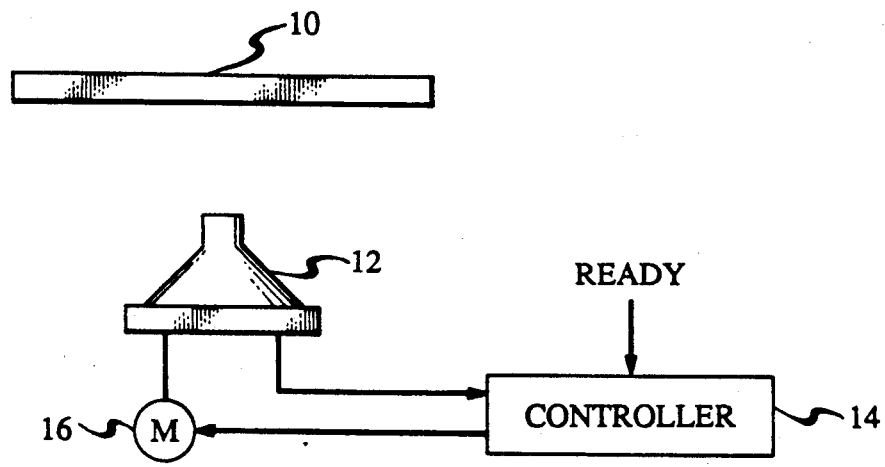
FIG. 1 shows a simplified block diagram of a document scanner, including a scanning platform, a rotatable scanning camera and controller for compensating for document skew.
Figure 2:
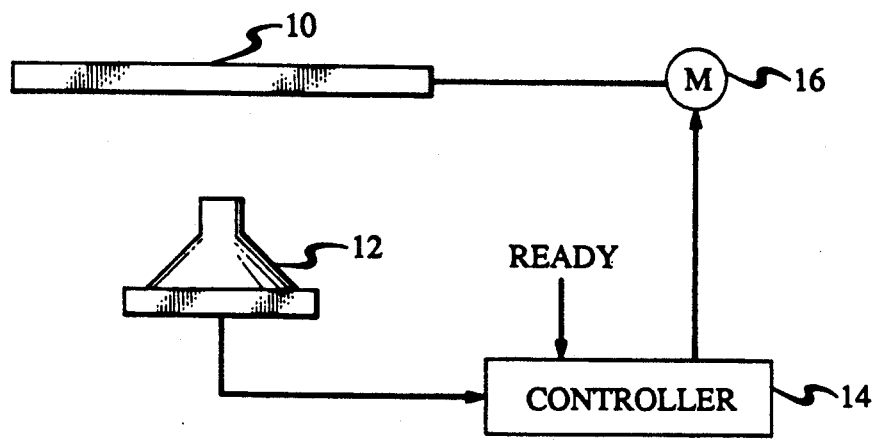
FIG. 2 shows a slightly different embodiment of the system of FIG. 1, in which the platform is rotatable.

FIG. 1 shows an illustrative document reader used to practice the invention. A document is placed automatically or manually on a transparent reading platform 10 where it is examined by a scanning device 12 in response to a READY signal arriving at a controller 14. The output of scanning device 12 is a stream of on/off pixels which reflect the document image on the platform 10 to the desired degree of resolution. Controller 14 processes the output from the scanning device in accordance with the algorithm described herein to determine the skew angle of the document. A signal is then applied to a motor 16 to rotate the scanning device 12 by an amount equal to the skew angle, thereby correcting for the document skew. Alternatively, motor 16 can be arranged to rotate the reading platform 10 rather than the scanning device 12 if desired, as shown in FIG. 2.

Figure 3:
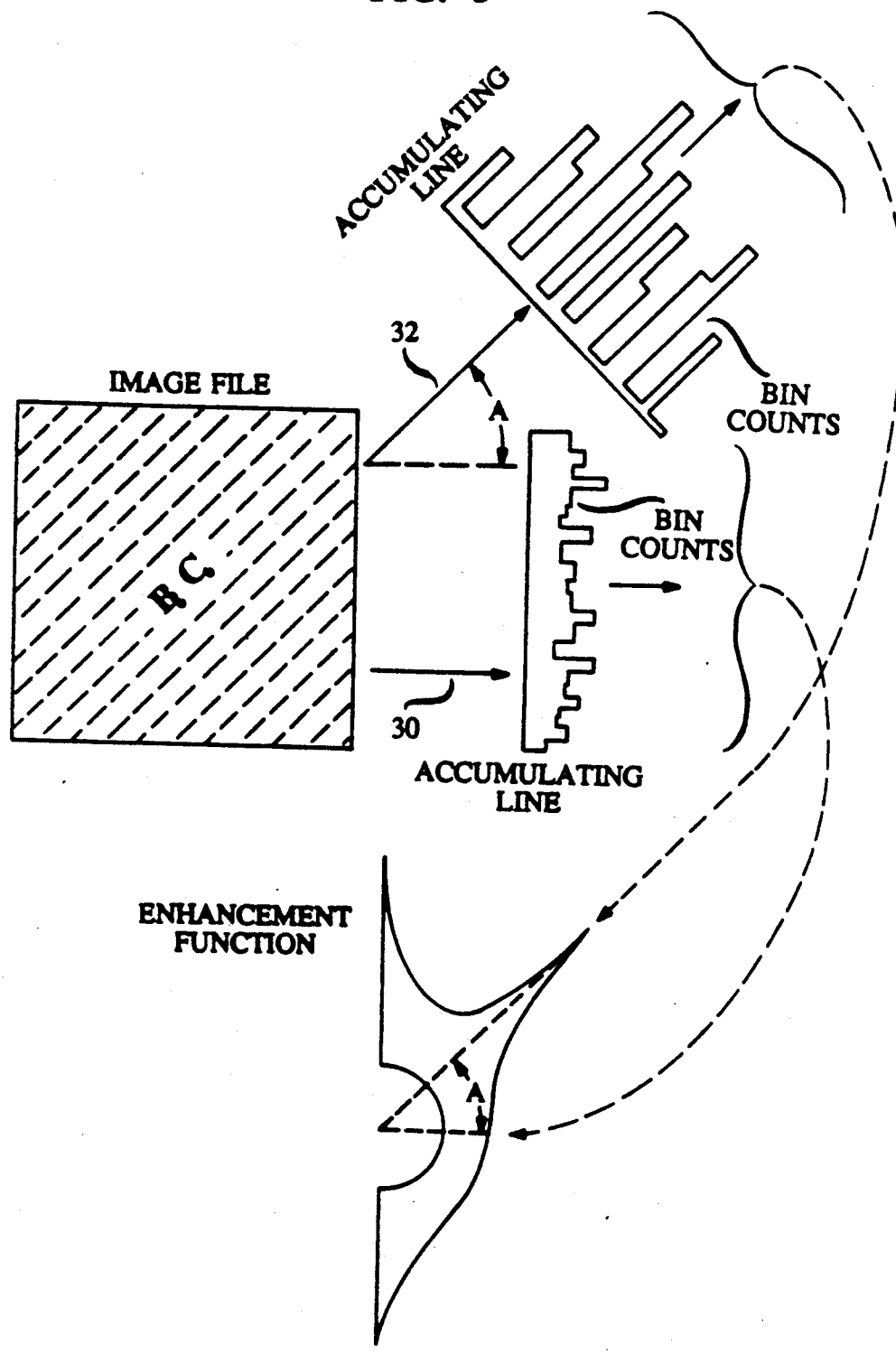
FIG. 3 conceptually illustrates the technique of the invention as aid to understanding.

FIG. 3 pictorially illustrates the technique used to find the skew of a document. On the left side of FIG. 3 is shown a document skewed by some angle A with respect to an angle of reference observed by the scanner 12. The initial image file transmitted from the scanner 12 to the controller 14 reflects this skew. After correction for skew, the document has a skew angle substantially equal to zero within any desired tolerance down to about 2 minutes of arc.

The skew finding technique consists of first performing a connected components analysis on the image file to locate separate printed objects, such as characters, of the document. FIG. 3 shows two such objects "B" and "C" as part of the image file. Connected components are called "blobs" in various comments of the source code, which is discussed below and disclosed in Appendices 1 and 2. Each connected component is replaced with a single reference point in the file. This is illustrated in FIG. 3 by a dot at the lower rightmost point of the connected components B and C. The lower right corner of a connected component is preferably chosen for three reasons. First, in English text, character baselines are usually more uniform than top-lines due to the relatively low frequency of descenders. Second, if skew angle is not far from a zero reference angle, then any bottom point is a good approximation to the true base height of the character. Finally, the lower right corner is easy to compute. However, other reference points, such as the lower midpoint, may also be selected.

The purpose of a connected components analysis is to determine those groups of black pixels of the image file that touch one another directly or indirectly, such as an isolated character. The source code for performing a connected components analysis is not disclosed in the source code. This is because the code disclosed is tailored for a mainframe environment in which the connected components analysis is performed separately. Once the connected components analysis has been performed, the reference points replace the associated connected components in the image file for further processing. The connected components analysis is a conventional technique and is not described further herein. The reader is referred to "Connected Components in Binary Images: the Detection Problem", Ronse, C. & Devijver, P., *Research Studies Press* (Letchworth, Hertfordshire, England, 1984), for details of one technique of performing such an analysis.

The reference points are projected at a number of angles into a plurality of contiguous segments, which we call "bins", which partition an imaginary accumulating line. For each projection, the number of reference points that fall into each bin are counted. An example projection at 30 of FIG. 3 is at zero degrees with respect to the skewed document. The bin counts are shown to the right of 30. A second example projection is shown at 32. This projection is taken at the skew angle A. The associated bin counts are shown to the right of projection 32. As illustrated by FIG. 3, at angles close to the correct skew angle, reference points that are in alignment accumulate in a small number of bins, so that the distribution of counts concentrates more into extremely large and small values. Methods for computing and exploiting a numerical measure of this behavior of the distribution of counts are important features of this invention.

If the size of the bins (their length of their segments along the imaginary accumulating line) is too small, then, even at correct alignment, noise can scatter the projected points so that only a few of the bin counts are larger than one. If the bins are too large, then small angular changes have little effect. The document or the capabilities of the particular scanning system should be taken into account. Preferably, the bin size is chosen to be a fraction of the smallest point size expected to occur. For a system that handles text down to about 6 points, the bin size is preferably chosen to be ⅓ of the 6-point text (5 pixels at a digitizing resolution of 300 pixels/inch).

A superlinear enhancement function, described below, is applied to each set of bin counts. As illustrated in FIG. 3, the enhanced distribution forms a dominant peak which is at its largest value at the correct skew angle. It is this peak that is used to determine the correct skew.

The controller 14 may be implemented in any number of ways. For example, it might be a circuit composed of discrete components, a custom integrated circuit chip, a microprocessor chip driven by firmware or software or a more conventional type of computer. For this discussion, it is assumed that controller 14 is a microprocessor driven by firmware contained in a ROM. The program contained within the firmware is disclosed below with respect to the flowcharts in FIGS. 4 through 8 and source code listings in Appendixes 1 and 2. The source code is written in the C programming language. Appendix 1 contains the code for the header information required by the C language and the code for the main flow of the program. Appendix 2 contains the remaining code. This language is described in many text books, including *The C Programming Language*, Kernighan and Ritchie, Prentice-Hall, Inc. (1978). Only the major aspects of the source code will be explained in detail, as any programmer skilled in the C language is able to discern the remaining details from the code. The source code as disclosed in the Appendixes is arranged for execution on a mainframe computer under the control of an operator at a terminal. It will be discussed in this context for consistency. Modifications to the source code to adapt it to the environment of FIGS. 1 and 2 will be obvious to a skilled programmer.

Figure 4:
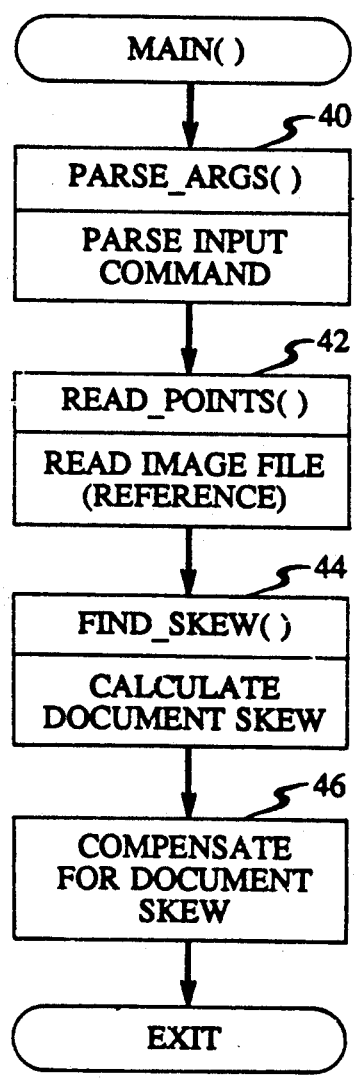
FIGS. 4 through 8 are flowcharts disclosing the principal steps of the invention.

Every C program is composed of a main function MAIN( ) and usually a number of other subfunctions or subroutines. A flowchart of MAIN( ) is shown in FIG. 4. The corresponding source code of MAIN( ) is disclosed at lines 262 through 290 of Appendix 1. At step 40 of FIG. 4, MAIN( ) first calls a subroutine PARSE_ARGS( ). PARSE_ARGS( ) examines an input command describing a file of reference points to process for skew. The reference points may be the black picture elements of the entire, or may have been selected by a connected components analysis. The command may also contain various optional arguments to select parameters such as skew tolerance limits. PARSE_ARGS( ) is disclosed at lines 143 through 260 of Appendix 1. Once the file of reference points to be processed is identified, MAIN( ) executes a subroutine READ_POINTS( ) to input that file at step 42 of FIG. 4 into main memory for processing. READ_POINTS( ) is disclosed at lines 292 through 326 of Appendix 1.

Step 44 calls a subroutine FIND_SKEW( ), which determines the skew of the set of reference points, as discussed below. FIND_SKEW( ) returns a value indicating the skew angle to MAIN( ) in variable "skew" at line 286 of Appendix 1. Step 48 then compensates for the skew. This compensation takes the form of a mere printout at line 287 of MAIN( ). In the system of FIGS. 1 and 2, the printout command "fprintf" at line 287 would be replaced with an output command to rotate the document platform 10 or the scanner 12.

The algorithm can be summarized as follows. It first probes at angles of coarse resolution until it detects the characteristic shape of the principal peak, and then refines the location of the peak's maximum by probes at finer resolution. Each probe computes the skew at a given angle, maintains a history of the probes, sorted by angle, and remembers the angle in variable SK.BEST.T whose skew value is largest. In the source code shown in Appendix 2, the user can suggest a preferred starting angle (variable SKEWO) (default is 0 degrees), an initial coarse resolution (variable RESO) (default is 0.5 degrees), and the finest resolution desired (variable RESF) (default is 0.0167 degrees). Probes are made at an initial angle SKEWO and at increments away from the initial angle at RESO, until a pattern emerges in which the present best angle SK.BEST.T is bracketed on both sides by at least three probes whose enhancement function values rise monotonically towards it. This completes the coarse location of the peak.

The location of the peak is then refined by an iterative procedure, each step of which is as follows. Below the present angle SK.BEST.T, a monotonically increasing subsequence of probes is selected whose enhancement function values rise monotonically. From this set of probes, no fewer than 3 and no more than 5 are selected to represent the "left slope" of the peak. Similarly, above the angle SK.BEST.T, a monotonically increasing subsequence of probes is selected whose enhancement function values fall monotonically. From this set of probes, no fewer than 3 and no more than 5 are selected to represent the "right slope" of the peak. Initially, those nearest to the present angle SK.BEST.T are chosen, but for later iterations (k), as probes cluster closely about the angle SK.BEST.T, the nearest k probes on each side of SK.BEST.T are ignored and farther ones chosen. These better describe the overall shape of the slopes near the peak. Smooth approximating functions are fitted to the left and the right slopes.

The intersection of these approximating functions is computed and becomes the center of a new set of probes at a new, finer resolution C_RESOL=C_RESOL/2. The above described step is iterated until C_RESOL falls below RESF. When this occurs, SK.BEST.T, the angle of the best probe so far, is returned as the PEAK angle.

Figure 5:
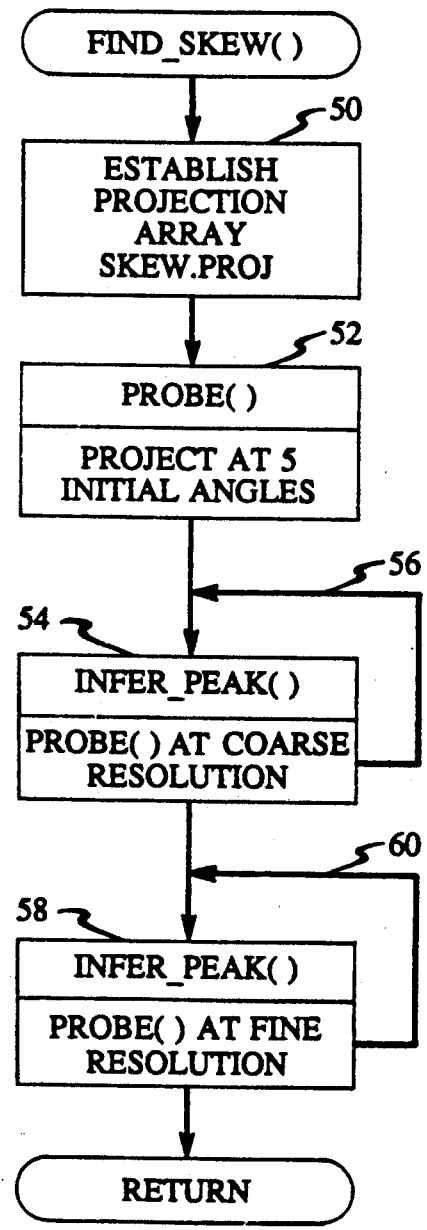
Figure 6:
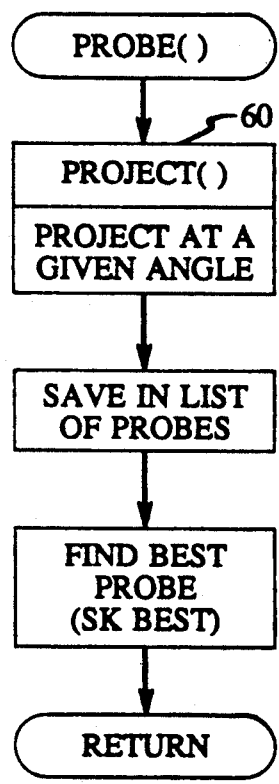

FIND_SKEW( ) is flowcharted in FIG. 5. The source code is shown at lines 528 through 679 of SKEWLIB.C in Appendix 2. Step 50 of FIG. 5 establishes a memory array into which angular projections across the document file can be made. This occurs beginning at line 559 of Appendix 2. Initially, a coarse resolution probing of the document file at five initial probing angles is performed. This is indicated as step 52 in FIG. 5 and begins at line 600 of Appendix 2. The actual probing is performed by a subroutine PROBE( ), which is illustrated in FIG. 6. The source code for PROBE( ) is shown in Appendix 2 at lines 495 through 526. PROBE( ) is called five times for the initial angles at lines 606 through 610 of Appendix 2. The initial angles include one at SKEWO degrees with respect to the document file and four other at coarse angles spaced at RESO degree increments on either side of SKEWO. Step 60 of PROBE( ) executes a subroutine PROJECT( ). PROJECT( ) is shown at lines 235 through 459 of Appendix 2. PROJECT( ) performs a projection at an angle contained in a variable "SKEW". The projection occurs at lines 235 through 432 of Appendix 2. The bin counts are accumulated in SK.PROJ at lines 332 through 361.

An enhancement function is applied to the bin counts at lines 416 through 418. Given a set of bin counts $c(i)$, where i is an index ranging from one to the number of bins, the enhancement function computes the sum of $E(c(i))$ over all i, where the function $E(c)$ is a "superlinear" function of c. That is, the value of $E(c)$ grows asymptotically faster than that of any linear function of c. Many such functions exist which appear to work satisfactorily in practice, for example, $E(c)=c \log c$, $E(c)=c*c$, and $E(c)=c*c*c$. Of these, $E(c)=c*c$ is preferred, however, because it is well-motivated theoretically and it is relatively easy to compute.

After the initial five projections are obtained, a subroutine INFER_PEAK( ) is iteratively called at line 614 of Appendix 2. This is shown at step 54 of FIG. 5. The iterations are symbolized by the flow line 56. INFER_PEAK( ) is repetitively called, each time with a new incremental angle RESO degrees removed from the last call, until enough probes have been obtained to define two slopes of the peak.

After the coarse location of the peak is found, this location is refined by a series of iterations of probes taken at finer resolution. These iterations occur at lines 621 through 668 of Appendix 2. As part of these iterations, PROBE( ) and INFER_PEAK( ) are iteratively executed with smaller incremental angles C_RESOL to further refine the search around the skew angle SK.BEST.T. This is shown as step 58 and flow line 60 in FIG. 5. Eventually, FIND_SKEW( ) returns with the best found skew angle in the variable SK.BEST.T. This occurs at line 678 of Appendix 2.

Figure 7:
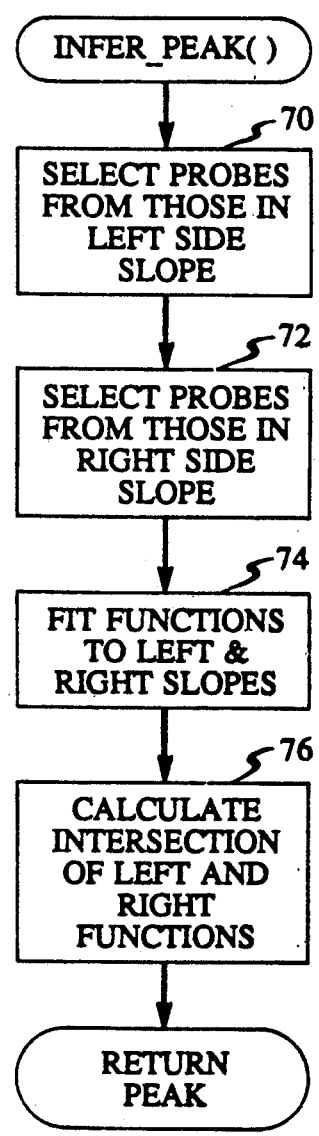

The flow chart of INFER_PEAK( ) is shown in FIG. 7. The code is shown at lines 90 through 233 of Appendix 2. At steps 70 and 72 of FIG. 7, the representative probes for the left and right slopes are selected (Appendix 2, lines 132–147 and 148–169, respectively). Using this information, a least-squares fitting procedure is used at step 74 (Appendix 2, lines 170-217) to approximate the left and right slopes. The intersection point of the left and right slope approximating functions is calculated at step 76 (Appendix 2, lines 218-231). The angle SK.BEST.T is returned to the calling routine in variable PEAK.

Figure 8:
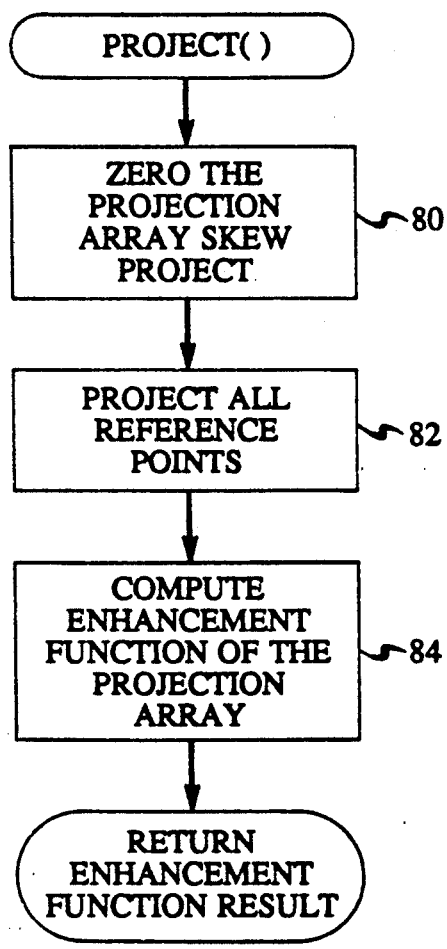

The flowchart of PROBE( ) is shown in FIG. 6. The source code is shown in lines 495-526 of Appendix 2. PROBE( ) calls a function PROJECT( ) at step 60. The flowchart of PROJECT( ) is shown in FIG. 8. The source code is shown in lines 235-432 of Appendix 2. PROJECT( ) initializes a projection array at step 80. At step 82, the reference points of the image file are projected at an angle contained in variable SKEW. An enhancement function is applied to the bin counts resulting from the projection at step 84 and the value of the enhancement function is returned to PROBE( ).

The skew-finding algorithm has been applied to many documents representative of a wide variety of typographical and layout styles, having been selected from books, journals, theses, and typewritten pages. The selected documents include multiple columns, mixed fonts at various sizes, headers, trailers, and footnotes. They all possessed a dominant skew angle. The algorithm detected skew as small as 1/5 of the height of the text characters. The algorithm is able to compute skew to an accuracy as great as 2 minutes.

Most documents require about 40 probes for convergence to two minutes of arc. Runtime for documents with over 1000 characters is dominated by probing, which in turn is dominated by projecting. The iterative probing technique is thus about a factor of 100 times faster than an exhaustive search over all angles at the desired resolution.

It is to be understood that the above described arrangements are merely illustrative of the application of principles of the invention and that other arrangements may be devised by workers skilled in the art without departing from the spirit and scope of the invention.

APPENDIX 1
SKEW.C

```
1:/* skew.h - include file w/ defines, structs, & global vars */
2:/* NOTE:  sensitive to prior:  #define MAIN 1 -- if occurs, then
3:   selects main() program declarations; else selects object library
4:   declarations */
6:#define Energy double  /* log-energy of set of projection bin-counts */
8:/* Probing for best skew */
9:typedef struct Probe {
10:   Radians t;    /* skew angle */
11:   Energy e; /* log-energy */
12:   short it; /* iteration no. (for debugging only) */
13:  } Probe;
15:/* globals for skew finding */
16:typedef struct Skew {
17:   Bbx  bx;       /* encloses all points */
18:   int  proj_max; /* (hgt(bx)+2*wid(bx))/BIN_SIZE */
19:   short   *proj;       /* short proj[SK.proj_max] */
20:   short   *proj_end;   /* SK.proj + SK.proj_max */
21:   int  proj_offset;  /* wid(bx)/BIN_SIZE */
22:   Probe   *probes;   /* [SK_PROBES_MAX], sorted asc on skew */
23:   int  probe_mny;    /* no. items currently in probes[] */
24:   Probe   **slope_probes;
25:   Probe   **lspa;      /* Probe *lspa[SK_PROBES_MAX], left-slope */
26:   Probe   **rspa;      /* Probe *rspa[SK_PROBES_MAX], right-slope */
27:   int  slope_dir;    /* +1 for right slope, -1 for left */
28:   Probe    best;       /* the probe of maximum energy seen so far */
29:   int  probes_total;
30:   int  getay_calls;
31:  } Skew;
33:double log();
35:/* Skew routines call function dnsf1_() from the F77 PORT library.  Must load
```

```
36:   in a special way:
37:   cc -c main.c   (whatever the main program is)
38:   cc -c skew.c
39:   f77 main.o skew.o ... -lport -o main
40:   Also, must place a "MAIN__() {};" declaration in the main source.
41:*/
42:#ifndef MAIN
43:#define MAIN 0
44:#endif 46:#if (MAIN)
47:   MAIN__() {};      /* to satisfy the f77 loader */
48:Radians find_skew();
49:   Skew SK;
50:boolean    SK_EXHAUSTIVE = F;  /* search exhaustively for best */
51:int    SK_BIN_SIZE = 5;    /* no. pixels in a projection bin */
52:int    SK_SLOPE_FIT_MIN = 3;    /* minimum no. probes required for fitting
*/
53:int    SK_SLOPE_FIT_MAX = 5;    /* maximum no. probes used in fitting */
54:double SK_REFINE = 0.5;    /* refine res by half each iteration */
55:/* at each iteration, require >= this many new probes on each side of best: */
56:int    SK_COVER = 3;
57:double SK_EXAGGERATE = 1.0;    /* exaggerate energy display */
58:int    SK_PROBES_MAX = 1000;    /* max no. probes permitted */
59:#else
60:extern Skew SK;
61:extern boolean SK_EXHAUSTIVE;
62:extern int SK_BIN_SIZE;
63:extern int SK_SLOPE_FIT_MIN;
64:extern int SK_SLOPE_FIT_MAX;
65:extern double SK_REFINE;
66:extern int SK_COVER;
67:extern double SK_EXAGGERATE;
68:extern int SK_PROBES_MAX;
69:#endif
71:#define SK_HGT (bbx_hgt(&SK.bx))
72:#define SK_WID (bbx_wid(&SK.bx))
73:#define SK_DIAG
((int)(sqrt((double)(SK_WID*SK_WID)+(SK_HGT*SK_HGT))))
74:/* skew.c - stand-alone program for skew-finding
75:USAGE: skew [options..] points_file
76:   where 'points-file' is an ascii file with one point per line,
77:   in the form of two integers X,Y
78:OPTIONS:
79:   -pn,m    [n,m] is range of point sizes expected (default: -p6,16)
80:   -Ss  starting angle for probing (degrees) (default:  0.0, horizontal)
81:   -Ii  initial resolution of probes for skew (degrees) (default: 0.5)
82:   -Ff  finest resolution (degrees) (default: 0.0167 (1 second of arc))
83:        (0.022 degrees is about 1 pixel high across an 8.5 inch page)
```

84:  -E   search exhaustively at resolution 'f' across range [s-c*i,s+c*i],
85:       return the maximum found
86:  -A   correct for Affine shear by determining skew also in the roughly-
87:       vertical direction (using -S(s+90), -Ii, -Ff as above)
88:  -bB  bin size (default: SK_BIN_SIZE in skew.h)
89:  -cC  cover (default: SK_COVER in skew.h)
90:  -xX  exaggerate projection-energy display by this factor
91:  -s   show on Metheus
92:  -mM  use Metheus
93:  -d   debug tracing to stderr
94:NOTE:
95: Skew angles are defined in an upright coordinate system, as seen on the
96:    graphics monitor:  0 degrees goes left to right, and 90 degrees goes UP.
97: */
99:#include <stdio.h>
100:#include <string.h>
101:#include <ctype.h>
102:#include <math.h>
103:#define MAIN 1
104:#include "/usr/ocr/stdocr.h"
105:#include "/usr/ocr/met.h"
106:#include "Text.h"
107:#include "scnmet.h"
108:#include "skew.h"
109:#define CMDNAME "skew"    /* for abort package */
110:#include "/usr/hsb/include/abort"
112: char *getenv();
113: double atof(),sqrt();
114:#define abs(x) (((x)>=0)? (x): -(x))
116:#define    DOT 3        /* each pt is displayed as square of side DOT */
117:#define STATS 1      /* show statistics */
119:/* options values */
120: short min_ps = 6, max_ps = 16;          /* -p */
121: Radians start_skew = 0.000/*degrees*/ /*DtoR;  /* -S */
122: Radians init_resol = 0.5/*degrees*/ /*DtoR;    /* -I */
123: Radians final_resol = 0.0167/*degrees*/ /*DtoR;    /* -F */
124: boolean exhaustive = F;          /* -E */
125: boolean affine_shear = F;        /* -A */
126: int bin_size;                    /* -b */
127: int cover;                       /* -c */
129: boolean show = F;                /* -s */
130: int metheus = -1;      /* -m (-1 ==> unspecified) */
131: boolean debug = F;               /* -d */
133:/* files */
134: char in_fn[120];
135: FILE *in_f;
136: char out_fn[120];
137: FILE *out_f;
139:/* fossils remaining in skewlib.o */

```
140: boolean show_all = F;
141: boolean _old = F;
143: parse_args(arc,arv)
144: int arc; char **arv;
145: {   /* getopt support */
146:    int optch;
147:    extern int optind;
148:    extern char *optarg;
150:    char *metheus_ev,metheus_digit,*fs;
152: /* default metheus number */
153: if((metheus_ev=getenv("FB"))!=NULL) {
154:     metheus_digit = metheus_ev[strlen(metheus_ev)-1];
155:     if(isdigit(metheus_digit)) {
156:         metheus = (metheus_digit - '0');
157:         };
158:     };
160: /* defaults from skew.h */
161: bin_size = SK_BIN_SIZE;
162: cover = SK_COVER;
164: while((optch=getopt(arc,arv,"p:S:I:F:EAb:c:x:sm:d"))!=E OF)
165:     switch(optch) {
166:         case 'p':
167:             switch(*optarg) {
168:                 case ' ':
169:                     abort("-p requires an argument");
170:                     break;
171:                 case '0': case '1': case '2': case
172:                 case '4': case '5': case '6': case
173:                  case '8': case '9':
174:                     if((fs=strtok(optarg,","))==NULL)
175:                         abort("can't parse - p%s",optarg);
176:                     min_ps = atoi(fs);
177:                     if((fs=strtok(0,","))!=NULL)
178:                         max_ps = atoi(fs);
179:                     else { max_ps=min_ps; min_ps=0; };
180:                     break;
181:                 case '#':
182:                     abort("-p# unimplemented");
183:                     break;
184:                 };
185:             break;
186:         case 'S':
187:             if(*optarg==' ') abort("-S requires an argument");
188:             start_skew = atof(optarg);  /* degrees */
189:             start_skew *= DtoR;    /* radians */
190:             break;
191:         case 'I':
192:             if(*optarg==' ') abort("-I requires an argument");
```

```
193:              init_resol = atof(optarg);   /* degrees */
194:              init_resol *= DtoR;      /* radians */
195:              break;
196:         case 'F':
197:              if(*optarg==' ') abort("-F requires an argument");
198:              final_resol = atof(optarg);  /* degrees */
199:              final_resol *= DtoR;  /* radians */
200:              break;
201:         case 'E':
202:              exhaustive = T;
203:              break;
204:         case 'A':
205:              affine_shear = T;
206:              break;
207:         case 'b':
208:              bin_size = atoi(optarg);
209:              break;
210:         case 'c':
211:              cover = atoi(optarg);
212:              break;
213:         case 'm':
214:              metheus = atoi(optarg);
215:              break;
216:         case 's':
217:              show = T;
218:              break;
219:         case 'x':
220:              exaggerate = atof(optarg);
221:              break;
222:         case 'd':
223:              debug = T;
224:              break;
225:         };
227: if(show&&(metheus==-1)) {
228:     err("FB=/dev/omM not specified, using /dev/om0");
229:     metheus = 0;
230:     };
232: /* pick up file name arguments */
233: in_f = stdin;
234: out_f = stdout;
235: switch(arc-optind) {
236:    case 2:
237:     strcpy(out_fn,arv[optind+1]);
238:     if( (out_f=fopen(out_fn,"w"))==NULL )
239:         abort("can't open output file %s",out_fn);
240:    case 1:
241:     strcpy(in_fn,arv[optind]);
242:     if( (in_f=fopen(in_fn,"r"))==NULL )
243:         abort("can't open input file %s",in_fn);
```

```
244:    break;
245:  case 0:
246:    break;
247:  default:
248:    abort("<= two filenames expected");
249:    break;
250:   };
252: if(debug)
253:   err("-S%g -I%g -F%g -b%d -c%d",
254:        start_skew/DtoR,
255:        init_resol/DtoR,
256:        final_resol/DtoR,
257:        bin_size,
258:        cover
259:        );
260: }
262:main(arc,arv)
263: int arc; char **arv;
264:{  Pointa pta;
265:   Bbx bx;
266:   Radians skew;
267: parse_args(arc,arv);
268: show_all = show;
269: if(show) {
270:    om_open(metheus); om_buffer(100000);
271:    M_clear_screen();
272:    om_force();
273:    };
274: read_points(in_f,&pta,&bx);
275: if(show) {
276:    SM_setup(&bx);
277:    SM_blank_PG();
278:    set_color(M_RED);
279:    SM_pointa(&pta,DOT);
280:    om_force();
281:    };
282: SK_BIN_SIZE = bin_size;
283: SK_COVER = cover;
284: SK_EXAGGERATE = exaggerate;
285: SK_EXHAUSTIVE = exhaustive;
286: skew=find_skew(&pta,&bx,start_skew,init_resol,final_res ol,!affine_shear);
287: fprintf(out_f,"skew: %.3f deg, %.5f energy, %d probes0,
288:         skew/DtoR,SK.best.e,SK.probes_total);
289: if(pta.pa!=NULL) free(pta.pa);
290: }
292:read_points(fp,ptap,bxp)
293:   FILE *fp;
294:   Pointa *ptap;
295:   Bbx *bxp;
```

```
296:#define LINELEN 120
297:#define FLDSEP " ,0
298:{   char l[LINELEN],*fs;
299:    Sp p; Bbx bx;
300:    ptap->mny = 0;
301:    ptap->pa = NULL;
302:    *bxp = null_Bbx;
303:    while(fgets(l,LINELEN,fp)!=NULL) {
304:        if((fs=strtok(l,FLDSEP))!=NULL) p.x = atoi(fs); else break;
305:        if((fs=strtok(0,FLDSEP))!=NULL) p.y = atoi(fs); else break;
306:        ptap->mny++;
307:        if(ptap->pa==NULL) {
308:            if((ptap->pa=(Sp *)malloc(ptap- >mny*sizeof(Sp)))==NULL)
309:                abort("can't malloc ptap->pa[1]");
310:        }
311:        else {
312:            if((ptap->pa=(Sp *)realloc(ptap->pa,ptap->mny*sizeof(Sp)))==NULL)
313:                abort("can't realloc ptap->pa[&d]",ptap- >mny);
314:        };
315:        ptap->pa[ptap->mny-1] = p;
316:        bx.a = bx.b = p;
317:        merge_bbx(&bx,bxp);
318:    };
319: }
```

APPENDIX 2
SKEWLIB.C

```
1:/* skewlib.c - library of skew-finding subroutine
2:NOTE:
3:   Skew angles are defined in an upright coordinate system, as seen on the
4:    graphics monitor:  0 degrees goes left to right, and 90 degrees goes UP.
5:*/

7:#include <stdio.h>
8:#include <math.h>
9:#include "/usr/ocr/stdocr.h"
10:#include "/usr/ocr/met.h"
11:#include "Text.h"
12:#include "scnmet.h"
13:#include "skew.h"

15:#define    DOT 2       /* each pt is displayed as square of side DOT */
16:#define STATS 1        /* show statistics */

18:extern boolean show_all;
19:extern boolean show_any;

21:boolean show_hor;      /* global among these functions */

23:#define dbg_peak F
24:#define dbg_skew F
25:#define dbg_project F
26:#define dbg_old F
```

```
28:/* assume that SM_PG_setup() has been called using the &Bbx passed to find_skew()*/
29:sh_probe(prp,qmax)
30:   Probe *prp;
31:   boolean qmax;  /* is this the latest maximum? */
32:{  Sp bas,end;
33:     Scoor len;
34:     Radians sh_t;
35:#define    TSCL ((SK_HGT/2.0)/(DtoR*30.0))   /* skew: +/- 30 deg is maximum can show */
36:#define EOFF 8.0
37:   if(show_hor) sh_t = prp->t; else sh_t = prp->t - (90.0*DtoR);
38:   if(qmax) set_color(M_RED);
39:   else set_color(M_PALE_GREEN);
40:   bas.x=StoPGX(SK.bx.a.x);
41:   bas.y=StoPGY((int)(((SK.bx.a.y+SK.bx.b.y)/2)- TSCL*sh_t));
42:   len=SM_scale*SK_WID*prp->e*SK_EXAGGERATE;
43:   if(len<0) len=0; else if(len>SM_scale*SK_WID) len=SM_scale*SK_WID;
44:   end.x = bas.x + len*cos(sh_t);
45:   end.y = bas.y - len*sin(sh_t);
46:   wtline(bas.x,bas.y,end.x,end.y);
47: }

49:/* called from DNFS1() (f77 PORT library);
50:    n,l,x are passed; AA & Y are returned */
51:getay_(n,l,x,AA,Y)
52:   int *n,*l;          /* n = no. points, l = no. linear parms */
53:   double *x,*AA,*Y;   /* x, AA[n][l], Y[n] */
54:{  int i;
55:     Probe **pp;
56:     double *sv_AA,*sv_Y,*svsv_Y;
57:   SK.getay_calls++;
58:   if(dbg_peak) {
59:        err("getay_(n%d,l%d,x%0.5f,...)",*n,*l,*x);
60:        sv_AA = AA;
61:        svsv_Y = sv_Y = Y;
62:        };
64:   for(i=0,pp=SK.slope_probes; i<(*n); i++,pp++) {
65:        *(AA++) = 1.0;    /* AA[*][0] -- linear parm 'a' */
66:        *(Y++) = (*pp)->e;
67:        };
68:   for(i=0,pp=SK.slope_probes; i<(*n); i++,pp++) {
69:        /* AA[*][1] -- linear parm 'b' */
70:        *(AA++) = 1.0/( (*x) + (SK.slope_dir*((*pp)->t)) );
71:        };
73:   if(dbg_peak) {
74:        fprintf(stderr,"    AA[*][a] = ");
75:        for(i=0; i<(*n); i++) {
76:             fprintf(stderr,"%6.3f ",*(sv_AA++));
```

```
77:        };
78:        fprintf(stderr,"    AA[*][b] = ");
79:        for(i=0; i<(*n); i++) {
80:            fprintf(stderr,"%6.3f ",*(sv_AA++));
81:        };
82:        fprintf(stderr,"    Y[*] =      ");
83:        for(i=0; i<(*n); i++) {
84:            fprintf(stderr,"%6.3f ",*(sv_Y++));
85:        };
86:        fprintf(stderr,"0");
87:        };
88: }
90:/* Infer a peak skew angle from the current set of probes. First, fit two
91:    smooth approximating functions to the log_energies of two sub-sequences of
92:    probes:
93:      (1) "left slope": sequence of probes with increasing skew and
94:          increasing energy;
95:      (2) "right slope": sequence with decreasing skew and
96:      increasing energy.
97:    Each slope is approximated (in a least-squares sense) by functions of the form
98:    energy(skew) = c /(a +/- b*skew).  ("+ skew" for right slope,
99:    "- skew" for left slope.) The intersection point (if any) of the two
100:   functions is then computed, and its skew angle returned; if they dont intersect,
101:   the midpoint of the gap between them is returned.
102:   If there are too few points on the left slope, return -2PI;
103:   if too few on right slope, return +2PI.
104:   To fit the slopes, we use the PORT library routine DNSF1().
105:   */
106:Radians infer_peak(resol,iter)
107: Radians resol;     /* current resolution of interest */
108: int iter;     /* iteration */
109:{
110:    Probe *pp;
111:    int pi;
112:    /* left slope: */
113:    Probe *lp,**lpp,**ulpp;
114:    int lp_mny;
115:    double l_a,l_b,l_c;  /* parameters of left slope curve */
116:    /* right slope: */
117:    Probe *rp,**rpp,**urpp;
118:    int rp_mny;
119:    double r_a,r_b,r_c;  /* parameters of right slope curve */
120:    /* machinery for call to dnsf1_() (f77) */
121:    int lin_mny;    /* no. of linear parameters (two: a & b) */
122:    double ab[2],c; /* parameters of fitted curve */
123:    double c_min,c_max;   /* user-supplied lower,upper bounds on c */
```

```
124:    double c_resol; /* resolution for c */
125:    /* to intersect the two approximating functions */
126:    double Aq,Bq,Cq; /* solve Ax^2 + Bx + C = 0 for intersection point x */
127:    double surd;
128:    Radians peak;
129: lin_mny=2;    /* constant: number of linear parameters */
130: c_resol = resol/100.0; /* want a close fit to non- linear parm c */
131: if(dbg_skew)err("infer_peak(%0.3fD)",resol/DtoR);
132: /* extract left slope */
133: lpp=SK.lspa; *lpp = SK.probes; lp_mny=1;
134: for(pp=SK.probes+1,pi=1; pi<SK.probe_mny; pp++, pi++) {
135:     if(pp->e > (*lpp)->e) {*(++lpp)=pp; lp_mny++;};
136:    };
137: lp_mny -= iter;   /* don't use in fitting 'iter' probes closest to max */
138: if(lp_mny<SK_SLOPE_FIT_MIN) {
139:     if(dbg_skew)
140:         err("can't infer left slope -- %d is too few probes",lp_mny);
141:     return(-2.0*PI);
142:     };
143: if(lp_mny<=SK_SLOPE_FIT_MAX) ulpp=SK.lspa;
144: else { /* use fewer than found */
145:     ulpp=SK.lspa+(lp_mny-SK_SLOPE_FIT_MAX);
146:     lp_mny=SK_SLOPE_FIT_MAX;
147:     }
148: /* extract right slope */
149: rpp=SK.rspa; *rpp = SK.probes+SK.probe_mny-1; rp_mny=1;
150: for(pp=SK.probes+SK.probe_mny-2,pi=1; pi<SK.probe_mny; pp--, pi++) {
151:     if(pp->e > (*rpp)->e) {*(++rpp)=pp; rp_mny++;};
152:     };
153: rp_mny -= iter;   /* don't use in fitting 'iter' probes closest to max */
154: if(rp_mny<SK_SLOPE_FIT_MIN) {
155:     if(dbg_skew)
156:         err("can't infer right slope -- %d is too few probes",rp_mny);
157:     return(2.0*PI);
158:     };
159: if(rp_mny<=SK_SLOPE_FIT_MAX) urpp=SK.rspa;
160: else { /* use fewer than found; and don't use the 'iter' nearest max */
161:     urpp=SK.rspa+(rp_mny-SK_SLOPE_FIT_MAX);
162:     rp_mny=SK_SLOPE_FIT_MAX;
163:     };
164: if(dbg_peak) {/* print left slope */
165:     err("left_slope: %d probes used",lp_mny);
166:     for(lpp=ulpp,pi=0; pi<lp_mny; lpp++,pi++)
167:         err("   %d: s%6.3fR(%0.3fD) e%5.3f",
168:             pi,(*lpp)->t,(*lpp)->t/DtoR,(*lpp)->e);
169:     }
170: /* fit left slope */
171: c_min = ulpp[lp_mny-1]->t + 0.1*resol;
172: c_max = c_min + 4.0*resol;
173: SK.slope_probes=ulpp;          /* used by getay_() */
```

```
174: SK.slope_dir=-1;            /* (ditto), and left slope faces left */
175: if(dbg_peak) err("c[%0.4f,%0.4f]R dir%d",c_min,c_max,SK.slope_dir);
176: dnsf1_(&lp_mny,&lin_mny,&c,&c_min,&c_max,&c_resol,ab);
177: l_a=ab[0]; l_b=ab[1]; l_c=c;
178: if(dbg_skew) {/* print curve */
179:     double s,e,fe,res;
180:     err("left fit: a%0.4f b%0.4f c%0.4f",
181:         l_a,l_b,l_c);
182:     for(lpp=ulpp,pi=0; pi<lp_mny; lpp++,pi++) {
183:         s=(*lpp)->t;
184:         e=(*lpp)->e;
185:         fe=l_a+(l_b/(l_c+(SK.slope_dir*s)));
186:         res=e-fe;
187:         err("  %d: s%6.4fR(%0.3fD) e%5.3f fe%5.3f res%5.3f",
188:             pi,s,s/DtoR,e,fe,res);
189:     };
190: };
191: if(dbg_peak) {/* print right slope */
192:     err("right_slope: %d probes",rp_mny);
193:     for(rpp=urpp,pi=0; pi<rp_mny; rpp++,pi++)
194:         err("  %d: %6.4fR(%0.3fD) %5.3f",
195:             pi,(*rpp)->t,(*rpp)->t/DtoR,(*rpp)->e);
196: }
197: /* fit right slope */
198: c_min = -(urpp[rp_mny-1]->t) + 0.1*resol;
199: c_max = c_min + 4.0*resol;
200: SK.slope_probes=urpp;    /* used by getay_() */
201: SK.slope_dir = 1;        /* (ditto), and right slope faces right */
202: if(dbg_peak) err("c[%0.4f,%0.4f]R dir%d",c_min,c_max,SK.slope_dir);
203: dnsf1_(&rp_mny,&lin_mny,&c,&c_min,&c_max,&c_resol,ab);
204: r_a=ab[0]; r_b=ab[1]; r_c=c;
205: if(dbg_skew) {/* describe curve */
206:     double s,e,fe,res;
207:     err("right fit: a%0.4f b%0.4f c%0.4f",
208:         r_a,r_b,r_c);
209:     for(rpp=urpp,pi=0; pi<rp_mny; rpp++,pi++) {
210:         s=(*rpp)->t;
211:         e=(*rpp)->e;
212:         fe=r_a+(r_b/(r_c+(SK.slope_dir*s)));
213:         res=e-fe;
214:         err("  %d: s%6.4fR(%0.3fD) e%5.3f fe%0.5f res%0.5f",
215:             pi,s,s/DtoR,e,fe,res);
216:     };
217: };
218: /* find intersection point of the slopes */
219: Aq = r_a-l_a;
220: Bq = l_a*(l_c-r_c) + r_a*(r_c-l_c) + (l_b+r_b);
221: Cq = l_c*r_c*(l_a-r_a) + l_b*r_c - r_b*l_c;
```

```
222: surd=Bq*Bq-(4.0*Aq*Cq);
223: if(dbg_skew) err("A%0.3f B%0.3f C%0.3f B^2-4AC %0.3f",Aq,Bq,Cq,surd);
224: if((Aq==0.0) ((-r_c-l_c)>0.0) (surd<0.0)) /* no intersection */ {
225:     /* pick midpoint of gap */
226:     peak=(l_c - r_c)/2.0;
227:     if(dbg_skew) err("interpolated peak%0.4fR(%0.3fD)",peak,peak/DtoR);
228:     }
229: else {   peak = (-Bq + sqrt(surd))/(2*Aq);
230:     if(dbg_skew) err("fitted peak %0.4fR(%0.3fD)",peak,peak/DtoR);
231:     };
232: return(peak);
233: }
235:/* Project the (bottom,right) points of bounding box of each Blob in given set,
236:   at an given angle, onto a projection line, and return the energy of the
237:   result */
238:Energy project(pap,skew,show_proj)
239:    Pointa *pap;
240:    Radians skew;    /* skew angle, radians */
241:    boolean show_proj;    /* show projection on Metheus */
242:{   register int en; /* enough range for files of <32K characters */
243:    register short *pr_or;    /* projection origin */
244:    short *cp;
245:    double sint,cost;
246:    Sp p_s,p_e;    /* start,end of projection line */
247:    int tli,tri,bli,bri;   /* top-left, top-right, bot- left, bot-right
248:                 page corner projection indices */
249:    Radians sh_skew; /* values used for show */
250:    double PR_sint,PR_cost;
251:    short mini,maxi;
252:    Energy result;
253:#ifdef dbg_project
254:    int lowi,highi;
255:#endif
256: if(pap->mny<=0) abort("project: must have >0 no. blobs");
257: sint=sin(skew);  cost=cos(skew);
258: if(show_proj) {
259:/* when displaying a projection, the pivot point is fixed */
260:#define PR_PIVOT_X (WR_ORX+2*SM_MARGIN)
261:#define PR_PIVOT_Y (WR_ORY+StoPGY(SK.bx.b.y)/2)
262:#define PR_WID (WR_WID-2*SM_MARGIN)
263:/* given a Metheus Y, compute its Metheus X along the PR line */
264:#define PR_MX(MY) (PR_PIVOT_X+((MY)-
PR_PIVOT_Y)*(PR_sint/PR_cost))
265:    if(show_hor) { sh_skew=skew; PR_sint=sint; PR_cost=cost; }
266:    else { sh_skew=skew-(90.0*DtoR); PR_sint=-cost; PR_cost=sint; };
267:    SM_clear_WR();
268:    p_s.y = WR_ORY-(SM_MARGIN/2);
269:    p_e.y = WR_ORY+StoPGY(SK.bx.b.y)+(SM_MARGIN/2);
270:    p_s.x = PR_MX(p_s.y);
```

```
271:    p_e.x = PR_MX(p_e.y);
272:    set_color(M_RED);
273:    wline(p_s.x,p_s.y,p_e.x,p_e.y);
274:    om_force();
275:    };
276: /**for(cp=proj; cp!=SK.proj_end; ) *(cp++)=0;**/  /* set counts to 0 */
278:/** The following speed optimizations cut 'project' time by a factor of 3
279:    from an earlier version **/
280:/** Compute projection in fixed-point arithmetic:
281:    Integers range in [-2^31,+2^31] and if we assume that coordinates (x,y) range
282:    in [-2^14,+2^14], then we can scale up sine and cosine (range in [-1.0,1.0])
283:    by factor of 2^16 (giving new (s',c') range in [- 2^16,+2^16]) and still
284:    compute expressions of the form s'*x+c'*y whose result must lie in
285:    [-2^31,+2^31], and so still in range of integer arithmetic.
286:    The final result is then rescaled down by dividing by 2^16.
287:    But faster than both dividing (X/MULT) and shifting right (X>>SHFT),
288:    is to pick out the high short from the resulting integer X.
289:    This works (+-1) even if X<0 (when X>>SHFT fails).
290:    **/
292:/** Summary history of speed optimization steps:
293:    no loop unrolling, using Blobs, /MULT division, and a debug variable
294:    34.20 3353 5.88  34.5   5.88   35   168.10 _project  100%
295:    UNROLL 5:
296:    34.20 3353 5.75  33.6   5.75   35   164.30 _project  98%
297:    AND, no debug in loop:
298:    34.20 3353 5.47  32.7   5.47   35   156.20 _project  93%
299:    AND, w/ point-array instead of Blobs:
300:    34.20 3353 5.22  30.8   5.22   35   149.06 _project  89%
301:    AND, UNROLL 20:
302:    34.20 3353 5.27  31.3   5.27   35   150.49 _project  89%
303:    AND, high-order-short pick instead of divide by 2^16:
304:    34.20 3353 4.45  28.2   4.45   35   127.15 _project  76%
305: Altogether, a reduction of about 25% in cost of inner loop
306:    **/
308:#define SHFT 16
309:#define MULT (01<<SHFT)   /* 2^16: multiple to convert from floating to fixed-pt */
310:/** Also, precompute binning effects at compile time: **/
311:#define BINMULT (MULT/SK_BIN_SIZE)
312:#define BOR (SK.proj_offset/SK_BIN_SIZE) /* bin origin (offset of the 0'th bin) */
313:#ifdef dbg_project
314:  lowi=3*SK_HGT;
315:  highi=-3*SK_HGT;
316:#endif
317: if(T) { /* just to permit local variables so can force registers */
318:         register Sp *pp;
319:         register int msina,mcosa;
```

```
320:    register int loops;
321:    register union { int i;  struct{short lo,hi;}ss; } pk;
322:    /* set projection origin so that the point SK.bx.a projects
323:       SK.proj_offset into the projection array */
324:    pr_or = SK.proj
325:         + (int)( (SK.proj_offset
326:              - ((sint*SK.bx.a.x)+(cost*SK.bx.a.y))
327:              ) / SK_BIN_SIZE );
328:         msina=(int)(BINMULT*sint);
329:    mcosa=(int)(BINMULT*cost);
330:    pp=pap->pa;
331:#define UNROLL 20
332:    /* do loop UNROLL points at a time */
333:    loops=pap->mny/UNROLL;
334:    while(loops--) {
335:        /* 'UNROLL'-many iterations: */
336:        pk.i=(msina*pp->x + mcosa*(pp++)->y); pr_or[pk.ss.hi]++;
337:        pk.i=(msina*pp->x + mcosa*(pp++)->y); pr_or[pk.ss.hi]++;
338:        pk.i=(msina*pp->x + mcosa*(pp++)->y); pr_or[pk.ss.hi]++;
339:        pk.i=(msina*pp->x + mcosa*(pp++)->y); pr_or[pk.ss.hi]++;
340:        pk.i=(msina*pp->x + mcosa*(pp++)->y); pr_or[pk.ss.hi]++;
341:        pk.i=(msina*pp->x + mcosa*(pp++)->y); pr_or[pk.ss.hi]++;
342:        pk.i=(msina*pp->x + mcosa*(pp++)->y); pr_or[pk.ss.hi]++;
343:        pk.i=(msina*pp->x + mcosa*(pp++)->y); pr_or[pk.ss.hi]++;
344:        pk.i=(msina*pp->x + mcosa*(pp++)->y); pr_or[pk.ss.hi]++;
345:        pk.i=(msina*pp->x + mcosa*(pp++)->y); pr_or[pk.ss.hi]++;
346:        pk.i=(msina*pp->x + mcosa*(pp++)->y); pr_or[pk.ss.hi]++;
347:        pk.i=(msina*pp->x + mcosa*(pp++)->y); pr_or[pk.ss.hi]++;
348:        pk.i=(msina*pp->x + mcosa*(pp++)->y); pr_or[pk.ss.hi]++;
349:        pk.i=(msina*pp->x + mcosa*(pp++)->y); pr_or[pk.ss.hi]++;
350:        pk.i=(msina*pp->x + mcosa*(pp++)->y); pr_or[pk.ss.hi]++;
351:        pk.i=(msina*pp->x + mcosa*(pp++)->y); pr_or[pk.ss.hi]++;
352:        pk.i=(msina*pp->x + mcosa*(pp++)->y); pr_or[pk.ss.hi]++;
353:        pk.i=(msina*pp->x + mcosa*(pp++)->y); pr_or[pk.ss.hi]++;
354:        pk.i=(msina*pp->x + mcosa*(pp++)->y); pr_or[pk.ss.hi]++;
355:        pk.i=(msina*pp->x + mcosa*(pp++)->y); pr_or[pk.ss.hi]++;
356:    };
357:    /* project last few points (<UNROLL) */
358:    loops=pap->mny%UNROLL;
359:    while(loops--) {
360:        pk.i=(msina*pp->x + mcosa*(pp++)->y); pr_or[pk.ss.hi]++;
361:    };
362:    /* compute projection indices for corners of page; used below
363:       to restrict reading and clearing to possibly >0 values */
364:    tli=(msina * SK.bx.a.x + mcosa * SK.bx.a.y)/MULT;
365:    tri=(msina * SK.bx.b.x + mcosa * SK.bx.a.y)/MULT;
366:    bli=(msina * SK.bx.a.x + mcosa * SK.bx.b.y)/MULT;
367:    bri=(msina * SK.bx.b.x + mcosa * SK.bx.b.y)/MULT;
368:    mini = (tli<tri)? tli: tri;
```

```
369:    if(mini>bli) mini=bli; if(mini>bri) mini=bri;
370:    mini--;
371:    maxi = (tli>tri)? tli: tri;
372:    if(maxi<bli) maxi=bli; if(maxi<bri) maxi=bri;
373:    maxi++;
374:    };
376: if(show_proj) {
377:#define    PR_SCL (PR_WID/pap->mny)   /* magnify project counts in display */
378:#define    NEAR_0_ANG (0.01*DtoR) /* 0.01 degree */
379:    short *pr,pi_mny;
380:    int pi;
381:    Sp cs,ce;
382:    int off;
383:    int pivot_bin;
384:/* which bin does the center of the page map to (relative to proj_offset)? */
385:#define PR_PIVOT_BIN (sin((PI/4.0)-skew-atan2((double)SK_WID,
      (double)SK_HGT))*SK_DIAG/(2.0*SK_BIN_SI ZE))
386:/* Bin B (relative to proj_offset) is at this Metheus Y on PR line */
387:#define PR_BIN_MY(B) (PR_PIVOT_Y+PR_cost*((B)-pivot_bin)*SK_BIN_SIZE)
388:    pivot_bin = PR_PIVOT_BIN;
389:    set_color(M_RED);
390:    off = (SK.proj_offset/SK_BIN_SIZE) - (pr_or - SK.proj);
391:    for(pi=mini,pr=pr_or+mini;
392:        pi<=maxi;
393:            pr++,pi++) if((*pr)>0) {
394:    if(dbg_old) fprintf(stderr,"pr_or[%d] [%d,%d] #%d",
395:        pi,pi*SK_BIN_SIZE,((pi+1)*SK_BIN_SIZE)- 1,*pr);
397:    cs.x = PR_MX(cs.y);
398:    if(cs.y<p_s.y   cs.y>p_e.y)
399:        {if(dbg_old)err(""); continue;}
400:    if(dbg_old) fprintf(stderr," cs(%d,%d)",cs.x,cs.y);
401:    ce.x = cs.x + (short)(PR_SCL * (*pr) * PR_cost);
402:    ce.y = cs.y - (short)(PR_SCL * (*pr) * PR_sint);
403:    if(dbg_old) fprintf(stderr," ce(%d,%d)0,ce.x,ce.y);
404:    wline(cs.x,cs.y,ce.x,ce.y);
405:    om_force();
406:    };
407:    };
408: if(show_proj) om_force();
410: /* compute energy, and clear array */
411: if(T) { /* just to permit local variables */
412:    register short p,*ps,*pr,*pe;
413:    /* this works for skew angle in range [-90,90] */
414:    ps = pr_or+(mini-1);
415:    pe = pr_or+(maxi+1);
416:    en=0;
```

```
417:    for(p=*(pr=ps); pr!=pe; pr++)
418:        if(*pr>0) { en += (*pr)*(*pr); *pr = 0; };
419:    };
420:#ifdef bdg_project
421: if(lowi<-BOR)
422:    err("lowi %d < -offset %d",lowi,-BOR);
423: if(lowi<((proj+BOR)-ps))
424:    err("lowi %d < ps %d",lowi,((proj+BOR)-ps));
425: if(highi>SK.proj_max-BOR)
426:    err("highi %d > max-offset %d",highi,SK.proj_max- BOR);
427: if(highi>((proj+BOR)-pe))
428:    err("highi %d > pe %d",lowi,((proj+BOR)-pe));
429:#endif
430: result=(double)en/(pap->mny*pap->mny);
431: return(result);
432: }
434:/* print to stdout the alignment measure for every angle in
435:    [skew0-res0,skew0+res0], at every resf increment */
436:out_align(selbsp,skew0,res0,resf)
437:    Blobs *selbsp;
438:    Radians skew0,res0,resf;
439:{   Probe pr;
440:    Pointa pta;
441:    Blob *bp,**bpp;
442:    Sp *pp;
443: /* make an array of points */
444: pta.mny = selbsp->mny;
445: if((pta.pa = (Sp *) malloc(pta.mny*sizeof(Sp))) == NULL)
446:     abort("find_page_skew: can't alloc pta.pa[%d]",pta.mny);
447: /* idealize location of each blob at the bottom midpoint */
448: for(bp=*(bpp=selbsp->bpa),pp=pta.pa; bp!=NULL; bp=*(++bpp),pp++) {
449:     pp->x = (bp->bx.a.x + bp->bx.b.x) / 2;
450:     pp->y = bp->bx.b.y;
451:     };
452: for(pr.t = skew0-res0;
453:        pr.t<=skew0+res0;
454:            pr.t += resf) {
455:     pr.e = project(&pta,pr.t,F /* don't show */);
456:     fprintf(stdout,"%0.4f %0.4f0,pr.t/DtoR,pr.e);
457:     };
458: free(pta.pa);
459: }
461:/* print to stdout all significant points of selected blobs */
462:out_Align(ptap)
463:    Pointa *ptap;
464:{   int pi;
465:    Sp *pp;
466: for(pi=0,pp=ptap->pa; pi<ptap->mny; pi++,pp++) {
```

```
467:       fprintf(stdout,"%4d %4d0,pp->x,pp->y);
468:     };
469: }
471:/* Store probe in global list maintained sorted increasing on skew. */
472:store_probe(pr)
473: Probe pr;
474:{    Probe sv;
475: int pi,c_pi;
476: if(pr.t > SK.probes[SK.probe_mny-1].t) { /* falls at end - easy case */
477:     SK.probes[c_pi=SK.probe_mny++]=pr;
478:     }
479: else {
480:     pi=0;
481:     while(pi<SK.probe_mny&&pr.t>SK.probes[pi].t) pi++;
482:     sv=SK.probes[pi];
483:     SK.probes[pi]=pr; c_pi=pi;
484:     if(++SK.probe_mny>SK_PROBES_MAX) abort("too many probes");
485:     while(pi<SK.probe_mny) {pr=sv; sv=SK.probes[++pi];
SK.probes[pi]=pr;};
486:     };
487: if(dbg_old) {
488:     for(pi=0;pi<SK.probe_mny;pi++)
489:         err("%d: %0.3f,%5.3f,%d",
490: pi,SK.probes[pi].t/DtoR,SK.probes[pi].e,SK.probes[pi].it);
491:       err("ret %d",c_pi);
492:     };
493: }
495:/* Probe: project the Blobs in a given set, at a given angle, and compute
496:   the energy resulting; as a side effect, store the results in a sorted
497:   list of Probes; update the maximum probe if required */
498:probe(pap,skew,maxp,iter)
499: Pointa *pap;
500: Radians skew;
501: Probe *maxp;
502: int iter;    /* iteration no (for debugging only) */
503:{    Probe pr;
504: pr.t = skew;
505: pr.e = project(pap,pr.t,F/* don't show */,T/*dont care*/);
506: pr.it = iter;
507: store_probe(pr);
508: if(pr.e > maxp->e) {
509:     if(show_all) {
510:         if(maxp->e>0.0) sh_probe(maxp,F);
511:         sh_probe(&pr,T);
512:         };
513:     *maxp = pr;
514:     if(dbg_skew) err("it%2d pr%2d: s%0.4fR(%7.3fD) e%5.3f NEW MAX",
515:             iter,SK.probes_total,pr.t,pr.t/DtoR,pr.e );
516:     }
```

```
517: else {
518:     if(dbg_skew) err("it%2d pr%2d: s%0.4fR(%7.3fD) e%5.3f",
519:         iter,SK.probes_total,pr.t,pr.t/DtoR,pr.e);
520:     if(show_all) {
521:         sh_probe(&pr,F);
522:         sh_probe(maxp,T);
523:         };
524:     };
525: SK.probes_total++;
526: }

528:/* Find the skew angle that shows the maximum "alignment" of the given set of
529:    points, enclosed in a given box.
530:    Start probing at skew0, and move outward by res0 intervals
531:    in both directions until infer_peak finds left- & right-slopes that are
532:    long enough to fit.
533:    Then generate more probes, at finer resolution, to cover the range defined
534:    by the infered peak and the global maximum so far. Repeat this until the
535:    current resolution is fine enough.
536:    If sh_hor is T, show angles as they are, else rotated -90 degrees. */
537:Radians find_skew(pap,bxp,skew0,res0,resf,sh_hor)
538:    Pointa *pap;    /* array of points */
539:    Bbx *bxp;       /* box enclosing all the points */
540:    Radians skew0;  /* the starting skew angle */
541:    Radians res0;   /* starting (coarsest) resolution */
542:    Radians resf;   /* final (finest) resolution */
543:    boolean sh_hor; /* T: show probe angles as they are; F: -= 90 degrees */
544:{   short *pr;
545:    Radians c_resol,peak;
546:    Radians s_min,s_max;   /* the min,max skew angles probed so far */
547:    Radians midpt,width;
548:    Radians pk_lb,pk_ub;   /* lower,upper bound for new probes around 'peak'*/
549:    Radians mx_lb,mx_ub;   /* lower,upper bnd, new probes around 'SK.best.t'*/
550:    Radians com,com_lb,com_ub,com_wid;
551:    Radians ang,step;
552:    Energy e;
553:    int si;
554:    int iter;       /* iteration no. */
556: show_hor = sh_hor;  /* make this flag global among skew fns */
558: SK.bx = *bxp;
559: /* setup projection array, etc */
560: SK.proj_max = (SK_HGT+2*SK_WID)/SK_BIN_SIZE;
561: if ((SK.proj = (short *) malloc(SK.proj_max*sizeof(short))) == NULL)
562:     abort("can't alloc skew proj[%d] array",SK.proj_max);
563: SK.proj_end = SK.proj + (SK.proj_max - 1);
564: /* clear projection array */
565: for(pr=SK.proj;pr<SK.proj_end;) *(pr++) = 0;
```

```
566: SK.proj_offset = SK_WID/SK_BIN_SIZE;
568: if(!SK_EXHAUSTIVE) {
569:    /* set up empty list of probes */
570:    if ((SK.probes = (Probe *) malloc(SK_PROBES_MAX*sizeof(Probe))) == NULL)
571:        abort("can't alloc skew probes[%d] array",SK_PROBES_MAX);
572:    if ((SK.lspa = (Probe **) malloc(SK_PROBES_MAX*sizeof(Probe *))) == NULL)
573:        abort("can't alloc skew lspa[%d] array",SK_PROBES_MAX);
574:    if ((SK.rspa = (Probe **) malloc(SK_PROBES_MAX*sizeof(Probe *))) == NULL)
575:        abort("can't alloc skew rspa[%d] array",SK_PROBES_MAX);
576:    SK.probe_mny=0;
577:    }
578: else SK.probes_total = 0;
580: if(show_all) { /* show projection array at skew0 */
581:    if(show_hor) project(pap,skew0,T); /* just for show */
582:    else project(pap,90.0*DtoR,T);
583:    wait();
584:    };
585: SK.best.e=0.0;
587:if(SK_EXHAUSTIVE) {
588:    for(ang = skew0-SK_COVER*res0; ang <= skew0+SK_COVER*res0; ang += resf) {
589:        if((e=project(pap,ang,F))>SK.best.e) {
590:            SK.best.e = e;
591:            SK.best.t = ang;
592:            };
593:        if(SK_OUT_ALL) {
594:            if(e>0.0) fprintf(stdout,"%7.3f %7.5f0,ang/DtoR,e);
595:            else err("%7.3f %7.5f - bad energy!0,ang/DtoR,e);
596:            };
597:        SK.probes_total++;
598:        }
599: }
600:else /* probe sparsely for peak */ {
601: iter=0;
602: c_resol=res0;
603: if(dbg_skew)
604:    err("iter %d c_resol %0.4fR(%0.3fD)",iter,c_resol,c_resol/DtoR);
605: /* first five probes, about skew0 */
606: probe(pap,s_min=(skew0-(2.0*res0)),&SK.best,iter);
607: probe(pap,skew0-res0,&SK.best,iter);
608: probe(pap,skew0,&SK.best,iter);
609: probe(pap,skew0+res0,&SK.best,iter);
610: probe(pap,s_max=(skew0+(2.0*res0)),&SK.best,iter);
611: if(show_all) om_force();
613: /* widen range as needed to satisfy infer_peak() */
614: while( ((peak=infer_peak(c_resol,iter)) <= -2.0*PI)
```

```
615:        (peak>=2.0*PI) ) {
616:    if(peak<=-2.0*PI) probe(pap,(s_min -= c_resol),&SK.best,iter);
617:    else probe(pap,(s_max += c_resol),&SK.best,iter);
618:    if(show_all) om_force();
619:    };
621: /* now, refine fit until done */
622: do { c_resol *= SK_REFINE;    /* user finer resolution */
623:    iter++;
624:    if(dbg_skew)
625:        err("iter %d c_resol %0.4fR(%0.3fD) peak %0.4fR(%0.3fD) max %0.4fR(%0.3fD)",
626:            iter,
627:            c_resol,c_resol/DtoR,
628:            peak,peak/DtoR,
629:            SK.best.t,SK.best.t/DtoR
630:            );
631:    /* ensure that range of new probes covers both the fitted 'peak'
632:        and the global maximum so far, with at least SK_COVER-many
633:        probes on each side */
634:    pk_lb = peak - (SK_COVER)*c_resol;
635:    pk_ub = peak + (SK_COVER)*c_resol;
636:    mx_lb = SK.best.t - (SK_COVER)*c_resol;
637:    mx_ub = SK.best.t + (SK_COVER)*c_resol;
638:    if(dbg_skew) err("pk[%0.3f,%0.3f]D mx[%0.3f,%0.3f]D",
639:            pk_lb/DtoR,pk_ub/DtoR,mx_lb/DtoR,mx_ub/D toR);
640:    if((pk_lb>mx_ub) (mx_lb>pk_ub)) /* they're disjoint */{
641:        /* cover both, separately, with new probes */
642:        for(step=c_resol/2.0,si=0;si<SK_COVER;step+=c _resol,si++) {
643:            probe(pap,peak-step,&SK.best,iter);
644:            probe(pap,peak+step,&SK.best,iter);
645:            };
646:        for(step=c_resol/2.0,si=0;si<SK_COVER;step+=c _resol,si++) {
647:            probe(pap,SK.best.t-step,&SK.best,iter);
648:            probe(pap,SK.best.t+step,&SK.best,iter);
649:            };
650:        }
651:    else /* they overlap: compute common range */ {
652:        com_ub = (pk_ub>mx_ub)? pk_ub : mx_ub;
653:        com_lb = (pk_lb<mx_lb)? pk_lb : mx_lb;
654:        com_wid = (com_ub-com_lb)/2.0;
655:        com = (pk_ub+pk_lb)/2.0;
656:        for(step=c_resol/2.0;step<=com_wid;step+=c_re sol) {
657:            probe(pap,com-step,&SK.best,iter);
658:            probe(pap,com+step,&SK.best,iter);
659:            };
660:        };
661:    while( ((peak=infer_peak(c_resol,iter)) <= - 2.0*PI)
662:        (peak>=2.0*PI) ) {
663:        if(peak<=-2.0*PI) probe(pap,(s_min -= c_resol),&SK.best,iter);
```

```
664:          else probe(pap,(s_max += c_resol),&SK.best,iter);
665:       };
666:    if(show_all) om_force();
667:    }
668: while(c_resol>resf);
669: if(show_all) { /* show projection array at best skew */
670:    wait();
671:    project(pap,SK.best.t,T);   /* just for show */
672:    };
673: /* free probes, projection array */
674: free(SK.probes); free(SK.lspa); free(SK.rspa); free(SK.proj);
675: if(dbg_skew) err_probes();
676: }
678:return(SK.best.t);
679: }
681:err_probes()
682:{    int pi;
683: for(pi=0;pi<SK.probe_mny;pi++)
684:     fprintf(stderr,"probe %2d:  %d %6.3f %6.3f0,
685:     pi,SK.probes[pi].it,SK.probes[pi].t/DtoR,SK.probes [pi].e);
686: }
```

I claim:

1. A method of determining a predominant angle of orientation of an image with respect to a reference angle, characterized by the steps of
    generating a file of picture elements depicting the image with respect to the reference angle,
    projecting the picture elements onto a plurality of contiguous segments of imaginary lines at selected angles across the file, wherein each imaginary line is perpendicular to its associated direction of projection,
    counting the number of picture elements that fall into the segments for each projection,
    applying an enhancement function to the segment counts of each projection, and
    finding the projection that generates the largest value of the enhancement function.

2. The method of claim 1 wherein the projecting step further comprises projecting first at a plurality of relatively coarse angles on both sides of the reference angle, and then projecting at more refined angles on both sides of the angle that generated the largest value enhancement function.

3. A method of determining a predominant angle of orientation of an image with respect to a reference angle, characterized by the steps of
    generating a file of picture elements depicting the image with respect to the reference angle,
    iteratively computing the number of picture elements that are projected onto each of a plurality of contiguous segments of an imaginary line by projections of the picture elements onto the imaginary line at selected angles across the file, wherein each imaginary line is perpendicular to the direction of projection,
    applying an enhancement function to the segment counts of each projection, wherein the enhancement function increases in value faster than a linear function,
    selecting as the dominant angle of orientation of the image that projection angle which generates the largest value of the enhancement function.

4. The method of claim 3 wherein the step of generating the file further comprises
    electronically scanning a document at the reference angle.

5. The method of claim 3 further comprising the step of
    identifying individual objects of the image,
    and wherein the step of iteratively computing further comprises
    compressing the file by representing each object with one or more picture elements, and
    performing the computing operations on the compressed file.

6. The method of claim 5 wherein the step of identifying individual objects further comprises
    identifying individual clusters comprising picture elements of the image that are connected to form an independent object,
    and wherein the step of compressing the file further comprises representing each cluster with one or more picture elements located at one or more selected points in the cluster.

7. The method of claim 5 or claim 6 further comprising the step of
    rescanning the document at the selected dominant angle of orientation.

8. The method of claim 3 wherein the step of iteratively computing the number of projected picture elements further comprises
    calculating the distribution of picture elements in the segments for each of a plurality of sample projections taken at relatively coarse projection angles on both sides of the reference angle,
computing the enhanced distribution function for each projection,
locating the peak of each enhanced distribution function,
fitting a monotonically increasing first function with positive slope to a first subset of the sample projections,
fitting a monotonically decreasing second function with negative slope to a second subset of the sample projections,
calculating the intersection of the first and second fitted functions, and
recalculating the distribution of picture elements in the segments at more refined sample projections using the intersection of the first and second functions as a new estimate of the dominant orientation.

9. Apparatus for determining a predominant angle of orientation of an image with respect to a reference angle, characterized by
means for generating a file of picture elements depicting the image with respect to the reference angle,
means for projecting the picture elements onto a plurality of contiguous segments of imaginary lines at selected angles across the file, wherein each imaginary line is perpendicular to its associated direction of projection,
means for counting the number of picture elements that fall into the segments for each projection,
means for applying an enhancement function to the segment counts of each projection, and
means for selecting the projection that generates the largest value of the enhancement function.

10. The apparatus of claim 9 wherein the means for projecting further comprises means for projecting first at relatively coarse angles on both sides of the reference angle, and then at more refined angles on both sides of the angle resulting from the coarse projections that generated the largest value enhancement function.

11. Apparatus for determining a predominant angle of orientation of an image with respect to a reference angle, characterized by
means for processing a file of information depicting the image in terms of picture elements with respect to the reference angle, wherein the means for processing includes
means for iteratively computing the number of picture elements that are projected onto each of a plurality of contiguous segments of an imaginary line by projections of the picture elements onto the imaginary line at selected angles across the file, wherein each imaginary line is perpendicular to the direction of projection,
means for calculating an enhancement function applied to the segment counts of each projection to form an enhanced distribution function for each projection, wherein the enhancement function increases in value faster than a linear function, and
means for selecting as the dominant angle of orientation of the image that projection angle which generates the largest value of the enhancement function.

12. The apparatus of claim 11 further comprising
means for electronically scanning a document at the reference angle to generate the file, and
means controlled by the selecting means for positioning the document or the scanning means so that the reference angle is aligned with the predominant angle of orientation of printed objects of the document.

13. The apparatus of claim 11 further comprising
means for identifying individual objects of the image, and wherein the computing means further comprises
means for compressing the file by replacing each object with one or more picture elements, and
means for performing the computing operations on the compressed file.

14. The apparatus of claim 11 further comprising
means for identifying clusters of picture elements of the image that are connected to form a single object, and
wherein the compressing means further comprises means for representing each cluster with one or more picture elements located at one or more selected points in the cluster, wherein the processing means operates on the compressed file.

15. The apparatus of claim 14 wherein the means for iteratively computing the number of projected picture elements further comprises
means for calculating the distribution of picture elements in the segments for each of a plurality of sample projections taken at relatively coarse projection angles on both sides of the reference angle,
means for computing the enhanced distribution function for each projection,
means for locating the peak of each enhanced distribution function,
means for fitting a monotonically increasing first function with positive slope to a first subset of the sample projections,
means for fitting a monotonically decreasing second function with negative slope to a second subset of the sample projections,
means for calculating the intersection of the first and second functions, and
means for recalculating the distribution of picture elements in the segments at more refined sample projections using the intersection point of the first and second functions as a new estimate of the dominant orientation.

* * * * *